United States Patent [19]

Delbecq et al.

[11] Patent Number: 4,672,726

[45] Date of Patent: Jun. 16, 1987

[54] MACHINE FOR REMOVING BURRS FROM SLABS

[75] Inventors: Gérard Delbecq, Grande Synthe; Jean-Pierre Markey, Hoymille-Bergues; Bernard Marcq, Dunkerque Malo Les Bains; René Val, Grande-Synthe, all of France

[73] Assignee: Usinor Aciers, Puteaux, France

[21] Appl. No.: 849,466

[22] Filed: Apr. 8, 1986

[30] Foreign Application Priority Data

Apr. 12, 1985 [FR] France ............................... 85 05553

[51] Int. Cl.[4] .......................... B23P 17/00; B23D 1/22

[52] U.S. Cl. .................................... 29/33 A; 29/81 J; 409/300; 409/301

[58] Field of Search .................... 29/33 A, 81 J, 81 D, 29/81 R; 409/297, 298, 300, 301, 258, 326, 346, 308, 312, 313; 164/263, 70.1, 70; 228/13

[56] References Cited

U.S. PATENT DOCUMENTS

| | | | |
|---|---|---|---|
| 1,328,034 | 1/1920 | Coe | 29/81 J |
| 1,984,762 | 12/1934 | Roberts | 29/81 J |
| 2,256,559 | 9/1941 | Harder | 29/33 A |
| 2,664,281 | 12/1953 | Luksch et al. | 29/81 J |
| 2,746,127 | 5/1956 | Jaques | 29/81 J |
| 3,198,081 | 8/1965 | Seeloff et al. | 409/300 |
| 4,362,448 | 12/1982 | Hasebe et al. | 409/300 |
| 4,372,020 | 2/1983 | Anderson et al. | 29/81 J X |
| 4,443,143 | 4/1984 | Asari | 409/298 X |
| 4,498,821 | 2/1985 | Cazaux | 409/300 |
| 4,522,540 | 6/1985 | Hasebe et al. | 409/308 X |

FOREIGN PATENT DOCUMENTS

| | | | |
|---|---|---|---|
| 112593 | 10/1978 | Japan | 409/301 |
| 113389 | 10/1978 | Japan | 409/301 |
| 512001 | 4/1976 | U.S.S.R. | 409/297 |

OTHER PUBLICATIONS

Revue de Metallurgie-CIT, Jun. 1983, p. 490, Fig. 11.

*Primary Examiner*—William R. Briggs
*Attorney, Agent, or Firm*—Cushman, Darby & Cushman

[57] ABSTRACT

The machine removes burrs from slabs (1) issuing from a continuous casting plant and cut to length by an oxygen cutting. The machine is of the type having a rotor mounted horizontally in a frame and carrying on its periphery means for removing the burrs. The burr removing means are self-retractable hammers (8) whose head (10) describes an envelope which is rendered substantially tangent to the lower side of the slab (1) by means (40, 36) for moving the rotor (4) vertically in translation carried by the frame (21, 22). The rotor (4) is driven by a driving shaft (51) whose rotation is controlled in one direction or the other by a control device as a function of the detection (C1, C2, C3) of the passage of the head end or foot end of the slab.

11 Claims, 6 Drawing Figures

MACHINE FOR REMOVING BURRS FROM SLABS

The present invention relates to a machine for removing burrs from continuously cast slabs or blooms which are cut to length by oxygen cutting.

In the continuous casting of steel, there is obtained a product in the form of a thick strip of steel which must be cut to given lengths so as to obtain slabs which are subsequently processed in subsequent rolling operations.

The product issuing from the continuous casting plant is converted into slabs by oxygen cutting with a torch which projects its jet in a direction perpendicular to the surface of the strip and produces on the side opposed to that receiving the jet from the torch, burrs of molten steel. These burrs formed by residues of the oxygen cutting are formed owing to the disturbance in the discharge of the residues of the cutting produced by the expansion of the residual gases at the exit end of the cutting slit. The effect of this phenomenon is to result in an adhesion of the residues not discharged on each end edge of the lower side of the slab.

In order to remove these burrs, French Pat. No. 2 467 041 proposes a machine comprising a group of cutting blades carried by a carriage whose translation along the longitudinal axis of the slab below the lower side of the latter, after putting their cutting edge in contact with this side, cuts off the oxygen cutting residues. This machine requires a stoppage of the slab on the roller table for the removal of the burrs and, moreover, it is advisable to provide two opposed symmetrical machines in front of the same side of the slab, respectively for removing the burrs at the head and foot end of the slab.

Such a stoppage of the slab constitutes an operation which is extremely disadvantageous as concerns the productivity of the plant, and the presence of two machines considerably increases its cost.

Rotary devices are also known such as those described in the U.S. Pat. No. 1,984,762 or the G.B. patent 736 381 which generally concern the cleaning up of metal and other surfaces but in which the means for eliminating undesirable particles, such as calamine and other asperities, are not adapted to the specific problem of the removal of oxygen cutting burrs at the head and foot ends of the slab.

An object of the present invention is to provide a machine for removing the burrs which are formed on the lower edges of the end faces of the slabs and have an adverse effect on the subsequent rolling operations, this machine moreover overcoming the drawbacks of the known machines.

The invention therefore provides a machine for removing burrs from slabs issuing from a continuous casting plant and cut to length by an oxygen cutting, of the type comprising a rotor mounted horizontally in a frame and carrying, on its periphery, burr removing means, wherein the burr removing means are self-retracting hammers whose head describes an envelope which is rendered substantially tangent to the lower side of the slab by vertical translation means for the rotor carried by the frame, the rotor being driven by a driving shaft whose rotation is controlled in one direction or the other by a control device as a function of the detection of the passage of the head end or foot end of the slab.

The retractable hammers are each in the form of an elongated mass having one end constituting the head and in the shape of a dove-tail and comprising in the vicinity of its other end a bore whose diameter is larger than the diameter of a pivot pin on which this hammer is freely rotatively mounted, so that there is obtained, in addition to a possibility of an angular retraction, a radial clearance which absorbs the variations in the height of the slab with respect to the axis of the rotor.

According to another feature, the rotor comprises a hub on which are fixed bearing cheeks receiving a group of pivot pins parallel to the axis of the shaft, which pins carry the hammers and are located at equal distances from the axis and are evenly spaced apart on the periphery of the bearing cheeks, the end journals of the hub being received in bearings carried by bearing blocks which are vertically movable in translation in the frame.

The burr removing machine according to the invention is placed under the main lower side of the slab whose head and foot end edges are edged with a burr, the axis of the rotor being disposed parallel to the side of the slab and at such distance therefrom that the heads of the hammers, biased under the effect of centrifugal force, describe a circular envelope tangential to the lower side of the slab and thus tear away the burr which projects from this side in the region of the edge.

In order to reduce the burr tearing forces, the axis of the rotor may be so disposed that it makes a relatively small angle with the end face of the slab, so as to act on the burr progressively as the slab advances.

An essential feature of the invention resides in the inversion of the direction of rotation of the rotor between the head and foot end of the slab, i.e. the leading end and trailing end of the latter in the direction of advance of the slab on the roller table. Indeed, optimum effect is achieved in the elimination of the burrs when the rotor rotates in the clockwise direction for tearing away the slab head end burrs when the slab travels from left to right above the rotor, and this direction is inverted for subsequently removing the slab foot end burrs. Now, this operating feature is made possible by the shape of the head of the hammers and their mounting on the rotor.

The direction of rotation of the rotor is controlled by infrared cells or other like means which detect the passage and the presence of the hot slab.

The invention is described in more detail hereinafter with reference to the accompanying drawings which show only one embodiment. In the drawings:

FIG. 1 shows a slab or bloom 1 previously cut to length by an oxygen cutting at a station (not shown)

Figure 2:
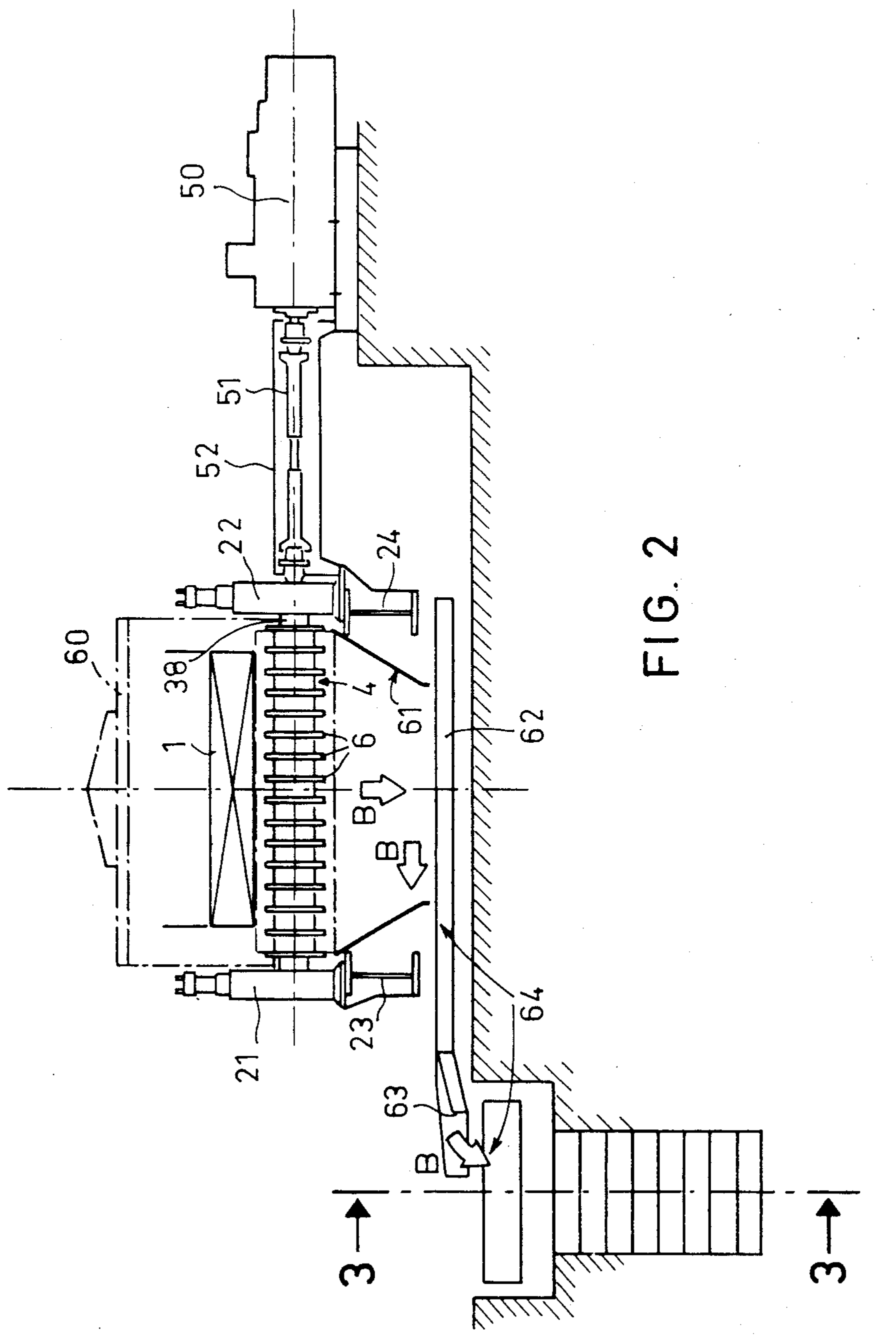
FIG. 2 is an elevational view and sectional view taken on line 2—2 of FIG. 4 of the burr removing machine.

located upstream of the slab with respect to the direction of travel of the slab indicated by the arrow, and comprising along end edges of its lower side undesirable burrs 2 and 3. The burr removing machine is diagrammatically shown below the lower side of the slab by its rotor 4 which includes a hub 5 on which are secured bearing cheeks 6 which are evenly spaced apart in the direction of the longitudinal axis of the hub 5, as shown in FIG. 2. The bearing cheeks 6 receive a group of pivot pins 7 disposed at equal distances from the axis of the hub 5 and evenly spaced apart on the periphery of the cheeks. In the illustrated embodiment, eight pins are disposed on the cheeks, but it will be clear that the number of pins may be varied.

The hammers 8 are freely rotatively mounted on the pivot pin 7. These hammers are in the form of an elongated member having adjacent one of its ends a bore 9 whose diameter is larger than the diameter of the pins 7 so that there is a radial clearance between these two elements.

Figure 1:
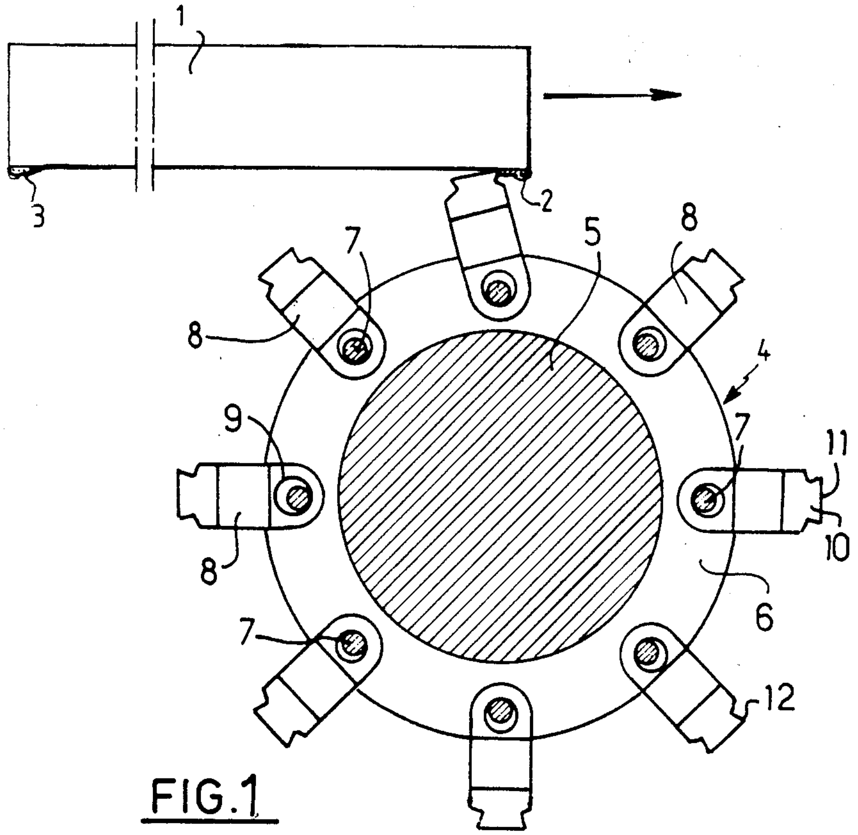
FIG. 1 is a diagrammatic sectional view taken on the longitudinal axis of the slab illustrating the principle of operation of the machine.
Figure 5:
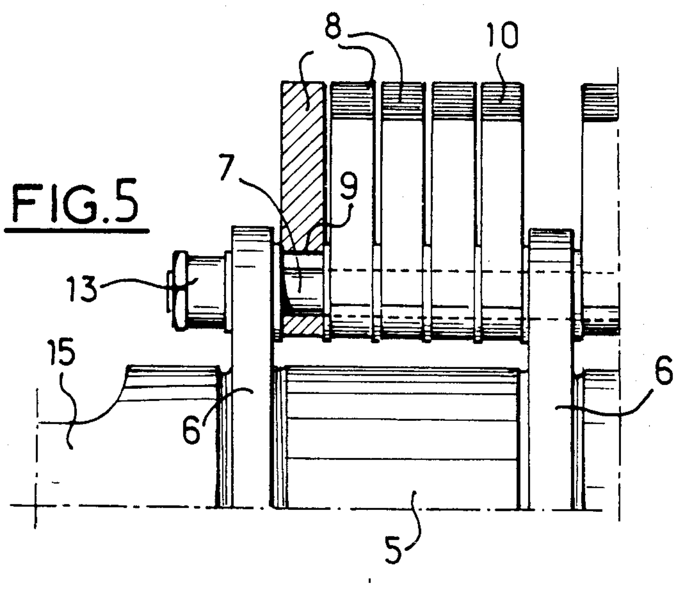
FIG. 5 is a partial elevational view of the self-retractable hammers disposed on the periphery of the rotor, one of these hammers being shown in section.

In FIG. 5, which shows in detail the assembly of the hammers 8 between two cheeks 6, it is clear that a group of hammers 8 is mounted on a common pin 7 which extends through all the cheeks in a direction parallel to a generatrix of the hub 5.

In the illustrated embodiment, all the hammers 8 of each group are identical, but it is possible, in a modification, to provide for each hammer adjacent to a cheek a portion which projects above the cheek, so that the assembly of the heads 10 of the hammers covers a complete generatrix on the length of the machine.

The heads 10 of the hammers have a dove-tail shape so as to include two symmetrical edges 11 and 12 which may be used in one direction of rotation of the shaft or in the other.

The pins 7 extending through all of the cheeks are retained on each side of the end cheeks by nuts 13 or other devices.

The self-retractable hammers are driven by the hub 5 and, under the effect of the force of gravity, assume a radial position the most remote from the axis of the hub 5. The position of the axis of the hub 5 relative to the lower side of the slab is so adjusted that, upon rotation, the envelope of the edges 11, 12 of the heads, is substantially tangent to the lower surface of the slab and intersects the burr. The blow of one of the edges 11 or 12 of the head 10 of the hammer against the burr provides the energy required for tearing away this burr. Under the effect of the blow exerted by the hammer 8, the latter angularly retracts as mentioned, and if its energy has not been sufficient to tear away the burr in a first passage alongside the slab, the following hammer strikes against the rest of the burr until the latter has been completely removed. In this way, the speed of rotation of the hub 5 is regulated as a function of the speed of displacement of the slab 1 so as to obtain a complete elimination of the burr by the successive blows exerted by the hammers on the burr.

The number of pivot pins 7 carrying the hammers is determined by the speed of rotation of the shaft, the speed of displacement of the slab and the required number of impacts of the burr for tearing it away upon its passage over the burr removing machine. In order to reduce the power required for removing the burr, the rotor 4 may be disposed below the slab 1 in such manner that its longitudinal axis makes an angle $\alpha < 10°$ illustrated in FIG. 4 with the perpendicular to the longitudinal axis of the slab 1. In this way, each group of hammers progressively act on the burr and the power required upon impact with the latter is much lower and also reduces the total impact supported by the pivot pins. It is for this reason that the hammers are in the form of a relatively narrow elongated mass which reduces the energy of the impact they are subjected to invidually, which is transmitted to the pin 7.

The rotor 4 shown in FIG. 2 in position below a slab 1 is mounted horizontally in a frame formed by two vertical columns 21, 22 which rest on girders 23, 24 supporting the adjacent rollers 31, 32 for discharging the slabs.

The identical columns 21, 22 are formed by two posts 33, 34 interconnected at their upper end by a cap 35 and defining therebetween an opening 36 in which is slidable a bearing block 37 carrying the bearing receiving the journal 38 of the rotor 4. This bearing block 37 is movable in translation with the movable rod 39 of a jack 40 mounted on the cap 35, which permits displacing the rotor 4 in a vertical direction.

This cap 35 is also provided with two adjustable screw abutments 41, 42 which permit the adjustment of the distance between the axis of the rotor and the lower side of the slab.

The bearing block 37 is connected to move in translation with the rod 39 of the jack by a ball joint 43 fixed to the rod of the jack, the ball being disposed in a yoke 44 provided with two coinciding apertures 45, 46 in which is mounted a pin 47 extending through the ball of the joint 43 and fixed to the yoke 44 by a stop plate 48. In the position of rest of the rotor, the bearing block 37 bears against the abutment 49.

The rotor 4 is driven in rotation by an electric motor 50 which is coupled thereto by a cardan joint transmission 51 protected by a channel 52. As mentioned before and shown in FIG. 4, the axis of the rotor may be inclined at an angle $\alpha$ relative to the perpendicular to the longitudinal axis of the table for discharging the slabs, so as to reduce the torque required for removing these burrs which are acted upon progressively by the same generatrix of the hammers of the rotor as the slab 1 travels through the machine.

Figure 3:
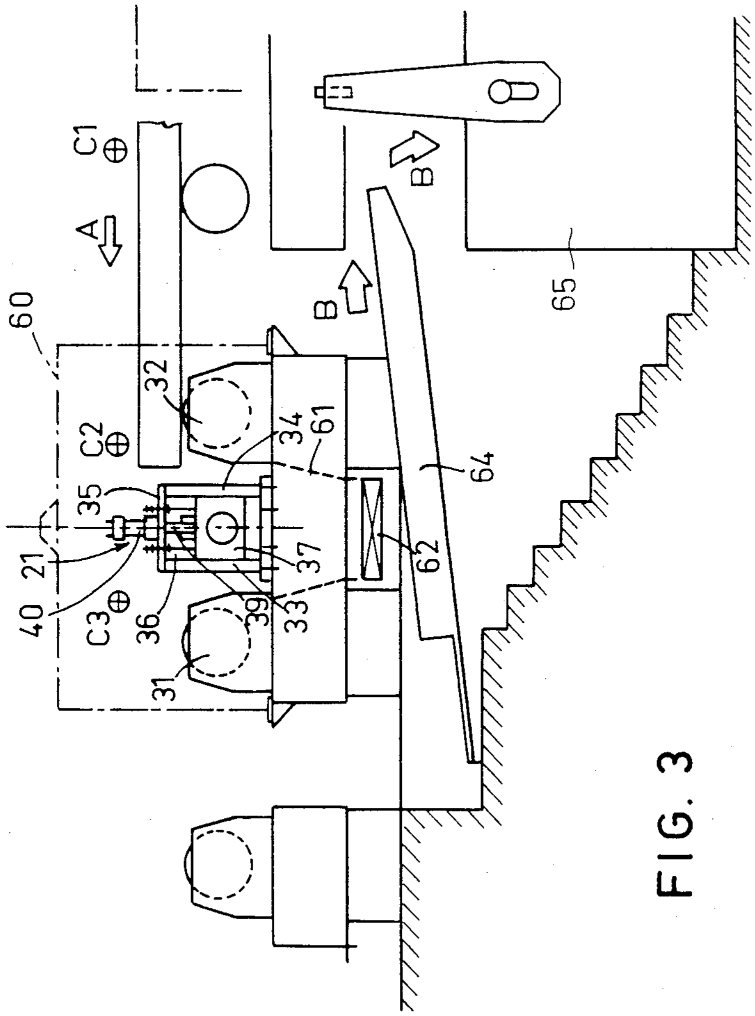
FIG. 3 is a side elevational view and sectional view taken on line 3—3 of FIG. 2.
Figure 4:
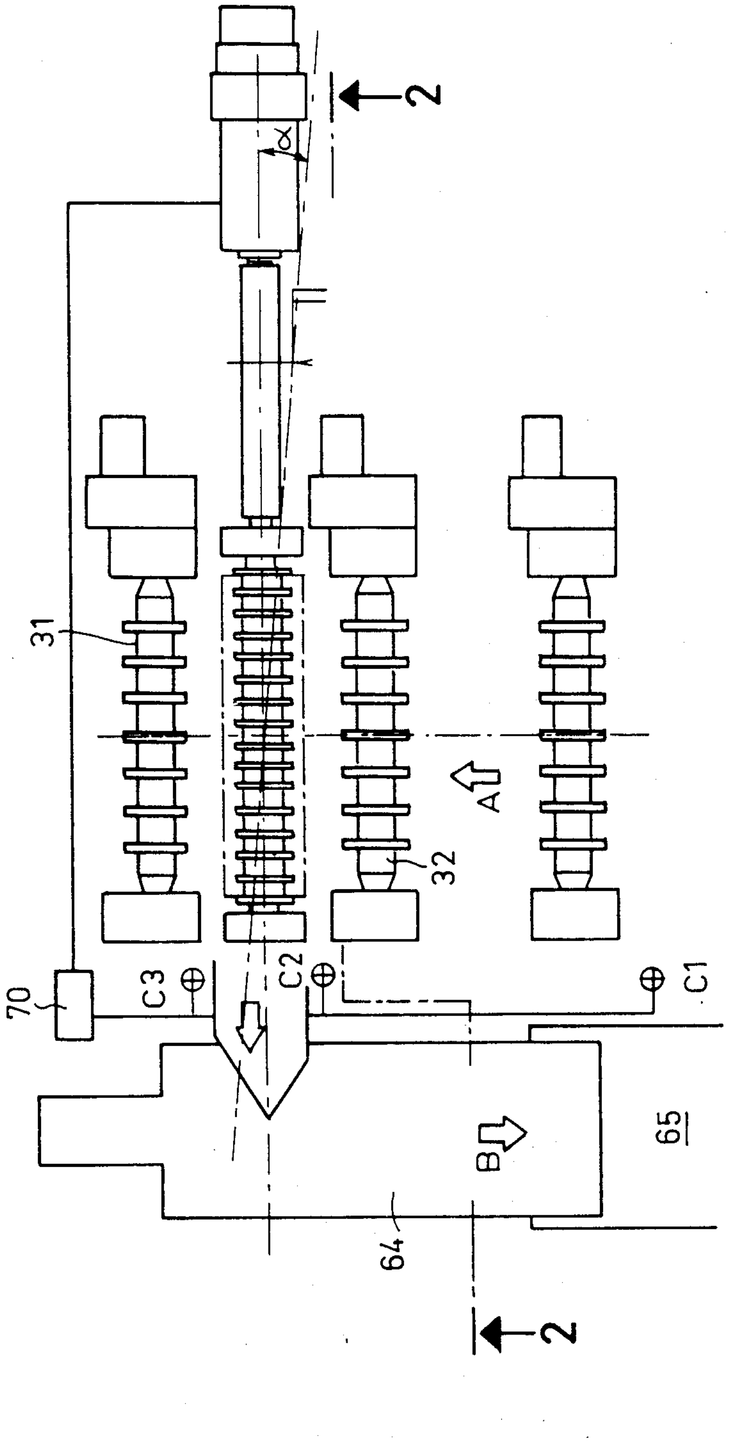
FIG. 4 is a top plan view of the machine of FIG. 2 without its protective hood.
Figure 6:
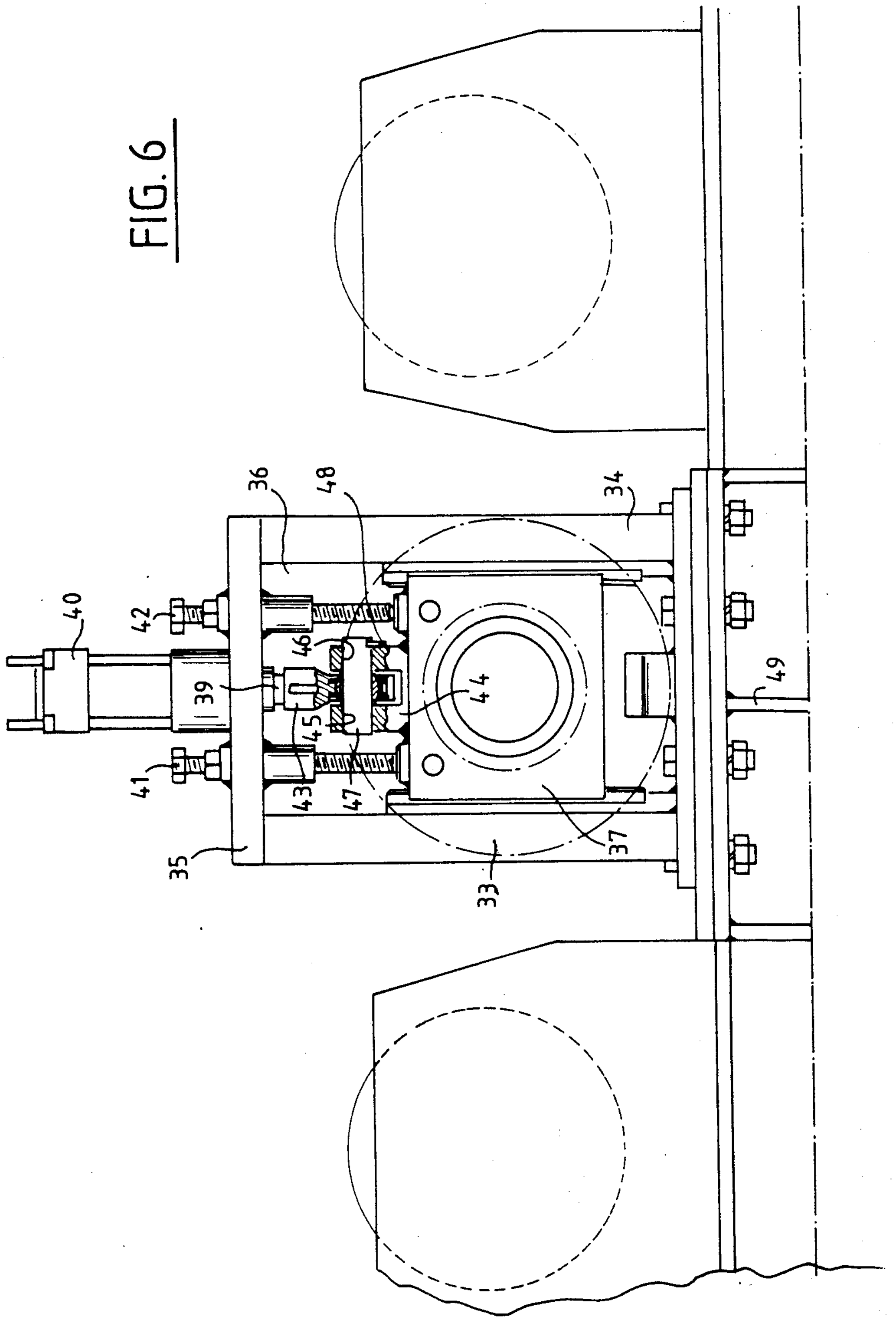
FIG. 6 is an elevational view, partly in section and to an enlarged scale, of a column of the frame of the machine shown in FIG. 3.

The starting up of the motor 50, the raising of the rotor 4 by vertical sliding of the bearing blocks 37 in the frame under the action of the jacks 40, and the descent and inversion of the direction of rotation of the motor 50, are controlled by a device 70 connected to sensors such as infrared cells C1, C2 and C3 disposed as shown in FIGS. 3 and 4, laterally and above the slab, the passage of which these cells detect. The cells C1 and C2 are placed in a position upstream of the rotor 4 and the cell C3 is placed in a position immediately downstream of the rotor, although other arrangements may be envisaged for rendering the precision of the detection of the position of the slab more fine. A logic circuit controls, as a function of the presence or absence of the slab facing each of the sensors C1, C2 and C3, the stages of the burr removing operation which is carried out in the following manner:

Before the arrival of the head end of the slab travelling to the left as shown by the arrow A, the rotor is made to rotate in the counter-clockwise direction as viewed in FIG. 3, upon the passage of the slab in the region of the cell C1, then the rotor is raised to a position tangential to the lower side of the slab when the head end of the latter arrives in alignment with the cell C2. When the head end of the slab arrives at the cell C3, the rotor is lowered and stopped. After detection of the passage of the foot end of the slab at C1, the rotor is caused to rotate in a direction opposed to that for the head end of the slab, then the detection by the cell C2 of the passage of the foot end of the slab causes the rotor to rise to the burr removing position, and the detection of the passage of the foot end of the slab at C3 determines the end of the burr removing cycle for a slab.

The burrs torn away by the hammers are received in a protective hood 60 which also surrounds the adjacent rollers 31 and 32, and drop into a hopper 61 and then onto a conveyor belt 62 whose longitudinal axis coincides with the axis of the rotor 4 when viewed in plan. The burrs are then poured by a shoot 63 onto another conveyor belt 64 and finally stored in a bin 65 for discharge. The direction of travel of the burrs is illustrated by the arrows B.

What is claimed is:

1. A machine for removing burrs from an edge of a side of a slab which issues from a continuous casting plant and is cut to length by oxygen cutting, the slab having a head and a foot end, said machine comprising a frame, a rotor rotatively mounted in horizontal position on the frame and having a periphery and an axis of rotation, burr removing means carried on the periphery of the rotor, the burr removing means comprising self-retractable hammers each having a head which, upon rotation of the rotor, is capable of describing an envelope, the rotor being movable in vertical translation relative to the frame to a given position in which said envelope described by the heads is substantially tangent to said side of the slab, means carried by the frame for shifting the rotor in vertical translation to said given position, a driving shaft drivingly connected to the rotor, means for detecting the passage of the head end and foot end of the slab through the machine, and a control device connected to the driving shaft for causing the shaft to rotate in selected ones of two directions of rotation as a function of the detection of the passage of the head end or foot end of the slab by said detecting means.

2. A machine according to claim 1, wherein the rotor comprises a hub, cheeks fixed on the hub and evenly spaced apart along said axis of rotation of the rotor, a group of pivot pins which are parallel to and spaced equal distances from said axis of rotation of the rotor and carried by the cheeks, the pivot pins being evenly spaced apart around the periphery of the cheeks and carrying the hammers, the machine further comprising bearing blocks which are movable vertically in translation in the frame and carry bearings, and the hub having end journals rotatively mounted in the bearings.

3. A machine according to claim 1, wherein the hammers each have an elongated shape and a first end portion constituting the head which has a substantially dove-tail shape and a second end portion defining a bore having a diameter larger than a diameter of that one of the pivot pins on which it is freely rotatively mounted.

4. A machine according to claim 2, wherein the frame comprises two columns which are disposed adjacent opposite ends of the rotor and are each provided with an opening in which opening the bearing blocks are slidable, two jacks mounted on an upper part of the columns above the openings being respectively connected to the bearing blocks and constituting said shifting means.

5. A machine according to claim 4, wherein each jack has a movable rod and a pivotal joint connects the rod to the respective bearing block, the pivotal joint including a yoke fixed to the bearing block and a pin extending through the yoke and connected to the rod.

6. A machine according to claim 1, comprising a motor drivingly connected to the shaft, said detecting means comprising sensors respectively located at positions upstream of and downstream of the rotor relative to the direction of travel of the slab through the machine, said control device controlling the direction of rotation of the motor.

7. A machine according to claim 4, wherein said control device controls the jacks simultaneously in synchronism.

8. A machine according to claim 6, wherein the sensors are infrared cells.

9. A machine according to claim 1, wherein said axis of rotation of the rotor is inclined at an angle of less than 10° with respect to a perpendicular to a longitudinal axis of the slab.

10. A machine according to claim 1, further comprising a protective hood covering the rotor, and a burr-recovering hopper provided under the rotor for discharging the burrs.

11. A machine according to claim 1, wherein each hammer adjacent to a cheek comprises a portion which projects above the cheek.

* * * * *